United States Patent [19]

Kanazawa et al.

[11] Patent Number: 5,083,628
[45] Date of Patent: Jan. 28, 1992

[54] REAR WHEEL STEERING DEVICE FOR A VEHICLE

[75] Inventors: Hirotaka Kanazawa; Hiroshi Ohmura; Takashi Nakashima, all of Hiroshima, Japan

[73] Assignee: Mazda Motor Corporation, Hiroshima, Japan

[21] Appl. No.: 609,636

[22] Filed: Nov. 6, 1990

[30] Foreign Application Priority Data

Nov. 6, 1989 [JP] Japan .................... 1-289604

[51] Int. Cl.⁵ ............................ B62D 7/15
[52] U.S. Cl. ........................ 180/140; 280/91
[58] Field of Search ............ 180/140, 142, 143; 280/91; 364/424.05

[56] References Cited

U.S. PATENT DOCUMENTS

| 4,730,839 | 3/1988 | Miyoshi | 280/91 |
| 4,896,737 | 1/1990 | Kanazawa et al. | 280/91 X |
| 4,953,648 | 9/1990 | Ohmura | 280/91 X |
| 4,953,652 | 9/1990 | Ohmura et al. | 280/91 X |

FOREIGN PATENT DOCUMENTS 57375 3/1988 Japan .................... 180/140

Primary Examiner—Charles A. Marmor
Assistant Examiner—Kevin Hurley
Attorney, Agent, or Firm—Sixbey, Friedman, Leedom & Ferguson

[57] ABSTRACT

A rear wheel steering device for a vehicle which is provided with a rear wheel steering shaft which steers rear wheels by its displacement, a neutrally holding means which constantly biases the rear wheel steering shaft to the neutral position, a motor which is linked with the rear wheel steering shaft and changes the steering angle ratio which is a ratio of the rear wheel steering angle to the front wheel steering angle by displacing the rear wheel steering shaft and an oil pressure assist means which assists displacement of the rear wheel steering shaft by the motor by oil pressure force. This device is further provided with oil pressure supply means which supplies oil pressure to the oil pressure assist means and oil pressure control means which, when working the motor at the initial check, controls the oil pressure supply means to make the oil pressure assist means supply oil pressure to the oil pressure assist means before working of the motor.

9 Claims, 6 Drawing Sheets

REAR WHEEL STEERING DEVICE FOR A VEHICLE

BACKGROUND OF THE INVENTION

This invention relates to a rear wheel steering device for a vehicle.

Conventionally, a four-wheel steering device which steers rear wheels, as well as front wheels, has been known in the art, as disclosed by the Japanese Patent Application Laying Open Gazette No. 59-26365, for example.

Such a device as mentioned above is provided with a rear wheel steering shaft which steers rear wheels by its displacement, neutrally holding means which constantly biases the rear wheel steering shaft to the neutral position, a motor which is linked with the rear wheel steering shaft and changes a steering angle ratio (ratio of the rear wheel steering angle to the front wheel steering angle) by displacing the rear wheel steering shaft, and oil pressure assist means which assists displacement of the rear wheel steering shaft by the motor by oil pressure force.

In the above device, in the case of four-wheel steering device of vehicle speed sensing, it is so controlled that the rear wheels are steered in the reverse phase (direction) at a low speed and in the same phase (direction) at a high speed in relation to the front wheels and at the vehicle speed=0, the steering angle ratio shows the maximum value in reverse phase (direction).

However, when a vehicle stops, due to delay in working of the motor which changes a steering angle ratio it sometimes occurs that the motor stops before a standard position where the steering angle ratio of the maximum value in reverse phase (direction) is attained and in the case where the engine stops in such fashion, oil pressure of the oil pressure means is relieved.

In the above case, when control is resumed by engine driving it is necessary in the first place to work the motor to attain the standard position even at the initial check which precedes the start of the rear wheel steering control.

At the above stage, however, oil pressure is not yet supplied to the oil pressure assist means which assists driving of the motor. Moreover, since a buffer mechanism comprising a spring which absorbs and buffers steering force to be transmitted to the rear wheel steering shaft at fail-safe, etc. is provided at the midway part of the system by which steering force is transmitted to the rear wheel steering shaft so that at the time of usual fail-safe two-wheel steering (only front wheels are steered) is made possible without transmitting handle steering force to the rear wheels, the above-mentioned standard position must be attained only by the force of the motor against the spring force, etc. of the buffer mechanism, without getting assist force by oil pressure. In order to enable us to carry out such operation of the motor accurately at any place including a cold district (−40° C., for example), it is required to make the capacity of a motor extremely large. This raises the problem of requirement of large size motors. On the other hand, if it is so designed that the rear wheel steering control can be resumed immediately without working the motor to attain the standard position, there is a danger that a big disagreement is caused between the controlled steering angle ratio by the control system and the actual steering angle ratio.

SUMMARY OF THE INVENTION

An object of the present invention is to provide a rear wheel steering device for a vehicle which has a small size motor for changing a steering angle ratio and prevents the steering angle ratio from turning the reverse phase (direction) side inadvertently, without impairing driveability.

In order to attain the above object, the device of the present invention is provided with a rear wheel steering shaft which steers rear wheels by its displacement, neutrally holding means which constantly biases the rear wheel steering shaft to the neutral position, a motor which is linked with the rear wheel steering shaft and changes the steering angle ratio (the ratio of rear wheel steered angle to the front wheel steered angle) by replacing the rear wheel steering shaft, oil pressure assist means which assists displacement of the rear wheel steering shaft by the motor by oil pressure force, oil pressure supply means which supplies oil pressure to the oil pressure assist means and oil pressure control means which controls the oil pressure supply means prior to working of the motor when working the motor at the initial check and supplies oil pressure to the oil pressure assist means.

With the above arrangement, when a motor which changes the steered angle ratio (the ratio of rear wheel steered angle to the front wheel steered angle) is worked at the initial check (from the system start to the starting of rear wheel steering operation control), oil pressure is supplied by the oil pressure supply means to the oil pressure assist means before the motor works. Thus, it is so designed that when the motor is worked at the initial check preceding the rear wheel steering control, oil pressure is supplied by the oil pressure supply means before the motor works and therefore the motor is oil pressure-assisted by oil pressure force and is put in the fixed state.

The present invention comprises further vehicle speed calculating means which calculates a vehicle speed, rear wheel steering control means which receives output of the vehicle speed calculating means and controls the motor so that a two-wheel steering position with a two-wheel steering angle ratio is attained according to judgment of "vehicle speed exists" at the initial check and a standard position with a steering angle ratio of the maximum value in reverse phase (direction) is attained according to judgment of "vehicle speed does not exist" at the initial check and first correcting means which receives outputs of the vehicle speed calculating means and the rear wheel steering control means and when controlling the motor to the two-wheel steering position according to judgment of "vehicle speed exists" at the initial check, controls the oil pressure control means so as to make the oil pressure supply means supply oil pressure to the oil pressure assist means.

The oil pressure supply means is a pair of electromagnetic normal open valves which are arranged in parallel at a drain passage through which oil exhausted from an oil pressure pump is returned to a tank and are kept open while not electrified. The rear wheel steering control means receives a signal from the oil pressure control means and control of the motor to the standard position where the steering angle ratio becomes the maximum value in reverse phase (direction) according to judgment of "vehicle speed does not exist" is performed after the lapse of the fixed hours following electric supply to a pair of electromagnetic normal open valves. The rear wheel steering control means changes the steering angle ratio according to the vehicle speed in reverse phase (direction) at a low speed and in the same phase (direction) at a high speed.

The present invention further comprises second correcting means which receives outputs of the vehicle speed calculating means and the rear wheel steering means and at the initial check makes the rear wheel steering control means start a rear wheel steering control with a new present position which is by the fixed degree toward the same phase side from the present position according to judgment of "vehicle speed exists" after start of movement control to the standard position.

The present invention further comprises a steering angle ratio detecting means which detects a steering angle ratio which is the ratio of the rear wheel steering angle to the front wheel steering angle, fail-safe means which receives outputs of the steering angle detecting means and the vehicle speed calculating means and performs fail-safe upon judging the disagreement between the vehicle speed and the steering angle ratio as fail and prohibiting means which is linked with the fail-safe means and prohibits fail-safe by the fail-safe means on the basis of disagreement between the vehicle speed and the steering angle ratio until the two-wheel steering position is attained, when controlling the motor to the two-wheel steering position according to judgment of "vehicle speed exists" at the initial check.

The present invention further comprises steering angle ratio varying means which is stroke-displaced in vehicle width direction according to the rear wheel steering angle and has an output shaft which displaces the rear wheel steering shaft in vehicle width direction through the medium of a displacement transmitting means, wherein the ratio of displacement quantity of the output shaft to the front wheel steering angle varies according to the quantity of rotation of the motor and a power steering means which generates steering force by utilizing oil pressure, wherein the oil pressure assist means is an oil pressure change valve having a valve member displaceable in axial direction in parallel with the axis of the output shaft. The valve member is linked with the output shaft and the rear wheel steering shaft through the medium of the displacement transmitting means and by displacement of the valve member, oil pressure supply to the power steering means is controlled.

The above and other objects and novel features of the present invention will become more apparent by reading the following detailed description with reference to the accompanying drawings.

BRIEF DESCRIPTION OF THE DRAWINGS

The accompanying drawings show preferred embodiments of the present invention, in which.

DESCRIPTION OF THE PREFERRED EMBODIMENTS

Description is made below of preferred embodiments of the present invention, with reference to the drawings.

Figure 1:
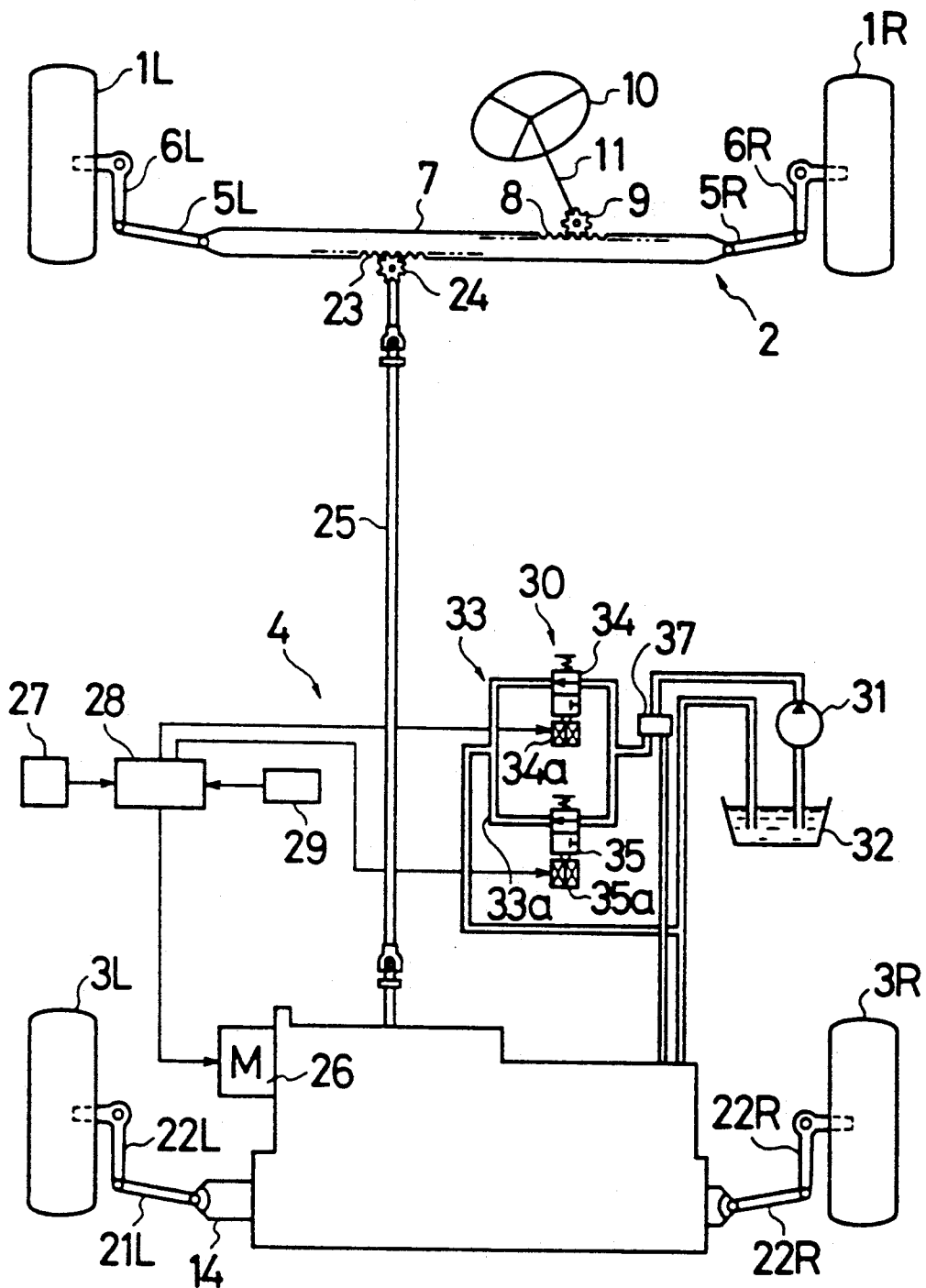
FIG. 1 is a view of an overall construction of a rear wheel steering device of a vehicle.

In FIG. 1 showing the overall construction of the rear wheel steering device of the present invention, a four-wheel steering device is provided with a front wheel steering device 2 which steers left and right front wheels 1L, 1R and a rear wheel steering device 4 which steers left and right rear wheels 3L, 3R.

The front wheel steering device 2 comprises a front wheel steering shaft 7 connected to a pair of (left and right) front wheels 1L, 1R through the medium of a pair of (left and right) tie rods 5L, 5R and a pair of (left and right) knuckle arms 6L, 6R and a steering wheel shaft 11 having at one end thereof a pinion 9 which meshes with a rack part 8 formed on the front wheel steering shaft 7 and at the other end thereof a steering wheel 10. Front wheels 1L, 1R are steered by displacing the front wheel steering shaft 7 in vehicle width direction by manipulation of the steering wheel 10.

The rear wheel steering device 4 steers rear wheels in accordance with the specified steering angle ratio, namely, in accordance with the steered angle of the front wheel and also changes the steering angle ratio according to the vehicle speed.

Figure 2:
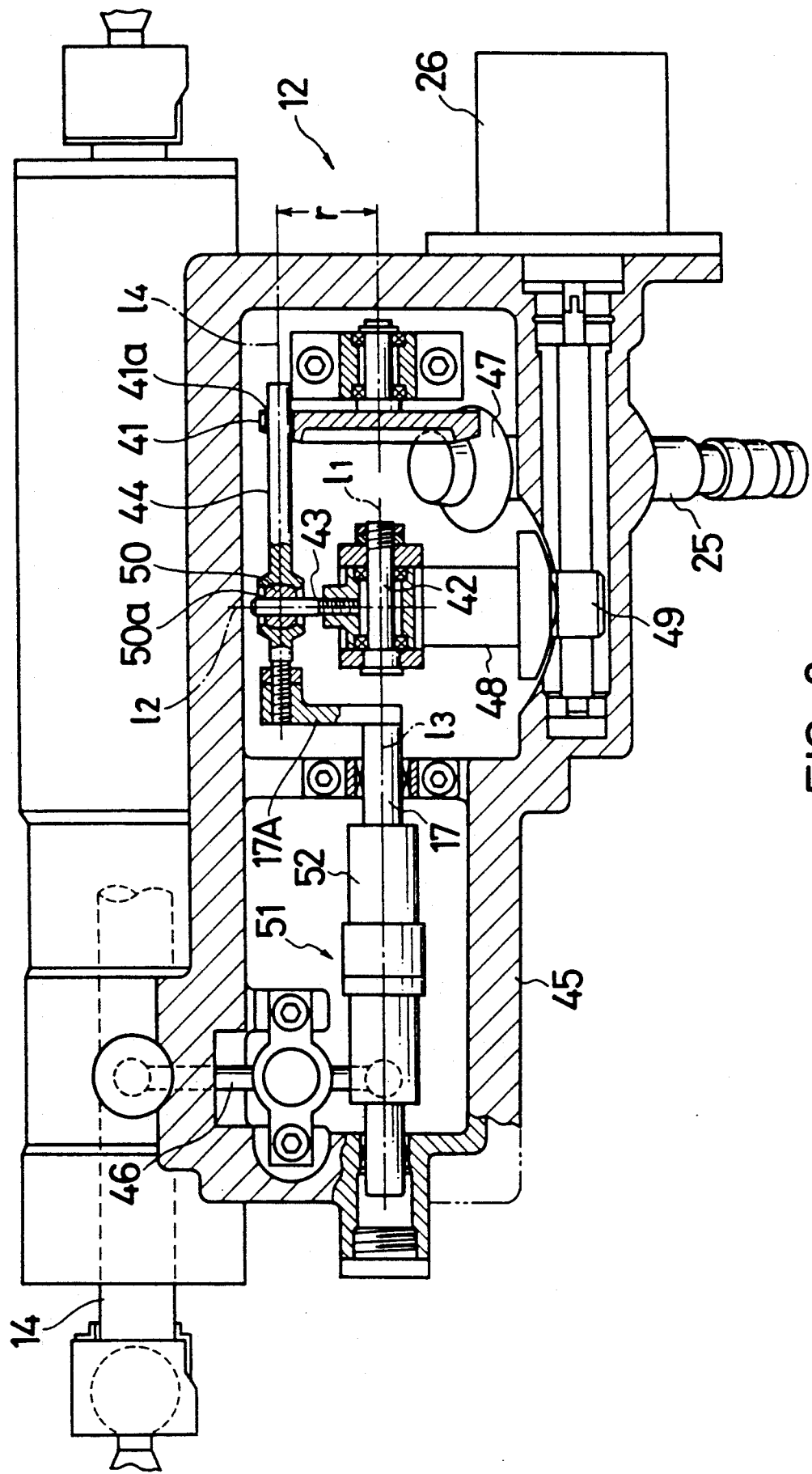
FIG. 2 is a cross section of a steering angle ratio varying means.
Figure 3:
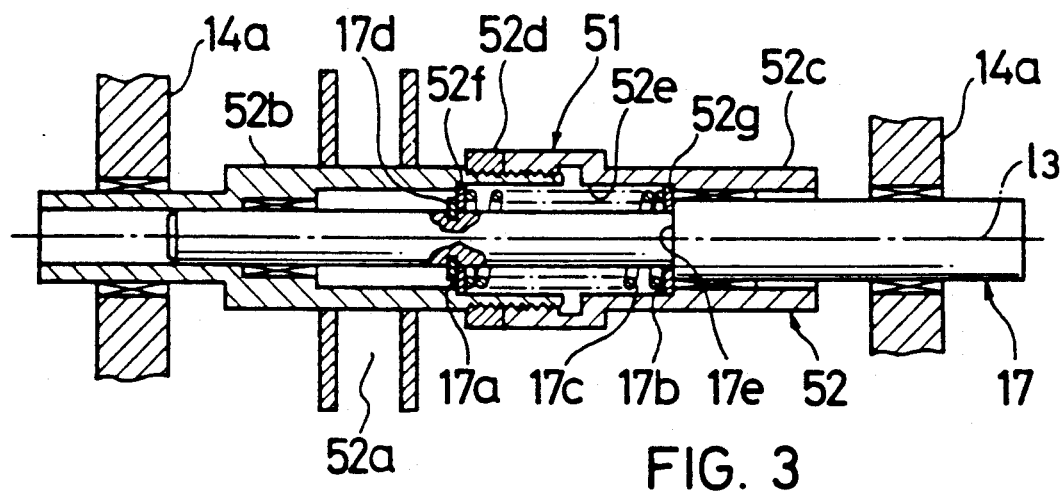
FIG. 3 is a cross section of an output displacement member.
Figure 4:
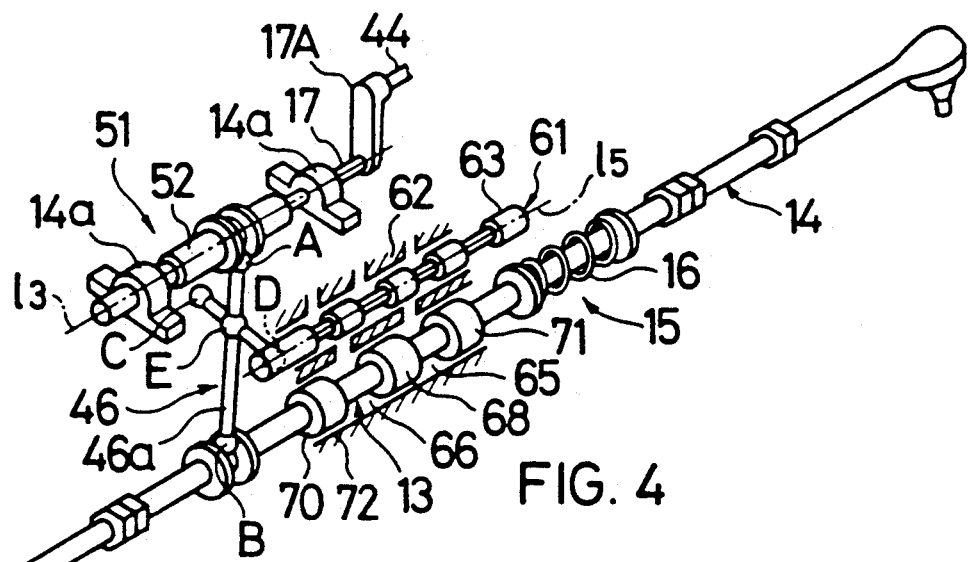
FIG. 4 is a rough perspective view of a steering device.

The rear wheel steering device 4 is provided with a steering angle ratio varying means 12, a power steering means 13, a rear wheel steering shaft 14, a neutrally holding means 15, a displacement transmitting means 46 and an oil pressure change valve 61 as an oil pressure assist means (refer to FIG. 2 through FIG. 4).

The rear wheel steering shaft 14 extends in a vehicle width direction and is connected, at both ends thereof, with a pair of (left and right) rear wheels 3L, 3R through the medium of a pair of (left and right) tie rods 21L, 21R and a pair of (left and right) knuckle arms 22L, 22R. The rear wheels 3L, 3R are steered by stroke displacement of the rear wheel steering shaft 14 in a vehicle width direction.

The neutrally holding means 15 is provided with a centering spring 16 in compressed state as shown in FIG. 4. The centering spring 16 constantly biases the rear wheel steering shaft 14 to the neutral position (straight advancing position of the rear wheels 3L, 3R).

The stroke displacement of the rear wheel steering shaft 14 in a vehicle width direction is performed by the steering angle ratio varying means 12 and the power steering means 13.

The steering angle ratio varying means 12 varies the steering angle ratio when steering the rear wheels 3L, 3R. This means 12 has an output shaft 17. A front wheel steering angle is inputted to the steering angle ratio varying means 12 through the medium of a rack part 23 formed on the front wheel steering shaft 7, a pinion 24 which meshes with the rack part 23 and a transmitting shaft 25 which rotates with the pinion 24. In accordance with the front wheel steering angle inputted, the output shaft 17 is stroke-displaced in a vehicle width direction.

It is so designed that the ration of displacement amount of the output shaft 17 to the inputted front wheel steering angle (corresponding to the steering angle ratio) varies with the amount of rotation of a stepping motor 26. The amount of rotation of the stepping motor 26 is controlled properly by a control means 28 on the basis of a vehicle speed signal to be outputted from a vehicle speed sensor 27. The actual amount of rotation of the stepping motor 26 is detected by a steering angle ratio sensor 29 and by a detection signal of the sensor 29, feedback control is performed.

Steering of the rear wheels 3L, 3R is performed by the power steering means 13 in accordance with the amount of displacement of the output shaft 17 in the steering angle ratio varying means 12.

The rear wheel steering device 4 is provided with the power steering means 13 which generates steering force by utilizing oil pressure. This power steering means 13 is equipped with a valve means 30 as an oil pressure supply means which extinguishes the rear wheel steering force (oil pressure in the power cylinder) in the power steering means 13 by draining from an oil pressure pump 31.

The valve means 30 is provided on a drain passage 33 which makes the part between the discharge side of the oil pressure pump 31 and an oil pressure change valve 61 (to be described later) communicate with a tank 32 so as to return oil discharged from the oil pressure pump 31 to the tank 32. The valve means 30 is composed of electromagnetic normal open valves 34, 35 (to be kept open while electrified). Reference numeral 37 designates a filter.

Both valves 34, 35 are controlled by the control means 28 to which various informations (not shown in the drawing) necessary for controlling the valves 34, 35 are inputted. More specifically, at the time of normal rear wheel steering both normal open valves 34, 35 are electrified, whereby solenoids 34a, 35a are excited and both valves 34, 35 are closed. Then, rear wheel steering force is generated on the basis of oil pressure discharged from the oil pressure pump 31 and by this steering force the rear wheels 3L, 3R are steered.

In the case where the specified abnormality took place at the rear wheel steering device 4, electric supply to both normal open valves 34, 35 is stopped so as to demagnetize solenoids 34a, 35a, open both valves 34, 35 and discharge oil pressure from the oil pressure pump 31 directly into the tank 32 via the drain passage 33. By this operation the rear wheel steering force in the power steering means 13 is extinguished, the rear wheel steering shaft 14 is returned to the neutral position by biassing force of the centering spring 16 (the neutrally holding means 15) and the fail-safe control (to put in the 2WS state) is performed. In the case where both valves 34, 35 are opened, oil discharged from the oil pressure pump 31 is discharged into the tank 32 via the valves 34, 35 due to high resistance at the part of the oil pressure change valve 61.

When an ignition switch is turned OFF, if terminal voltage of the output terminal of an alternator lowers below the fixed value, electric supply to both valves 34, 35 is stopped and as a result, both valves 34, 35 are opened.

As shown in FIG. 2, the steering angle ratio varying means 12 is provided with a bevel gear 41, a rocking shaft member 42, a pendulum arm 43 and a connecting rod 44, all of which are provided in a case 45.

The output shaft 17 of the steering angle ratio varying means 12 is supported in the case 45 slidably in its axis direction. By stroke displacement of the output shaft 17 in its axis direction, the rear wheel steering shaft 14 is displaced in the axis direction (vehicle width direction) through the medium of a displacement transmitting means 46, whereby the rear wheels 3L, 3R linked with both end portions of the rear wheel steering shaft 14 are steered.

The bevel gear 41 is supported in the case 45 rotatably around the axis which is coaxial with the output shaft 17. With the rotation of a pinion 47 (at a rear end portion of the transmitting shaft 25) meshing with the bevel gear 41 by manipulating a steering wheel, the bevel gear 41 rotates around the above axis.

The rocking axis member 42 has an axis which can be coaxial with the output shaft 17 (position shown in FIG. 2) and is fixed to a rocking gear 48. The rocking gear 48 meshes with a worm 49 which is rotated by driving of the stepping motor 26 and rotates around the axis (perpendicular in the drawing) which intersects the axis 11 of the rocking shaft member 42. By this rotation of the rocking gear 48, the rocking shaft member 42 is also rotated.

The pendulum arm 43 is connected, rockably around the axis 11 of the rocking axis member 42, with the rocking axis member 42. The position at which the pendulum arm 43 is connected with the rocking axis member 42 is so determined that the axis 12 of the pendulum arm 43 passes the intersecting point of the rotation axis and the axis 11 of the rocking axis member 42.

The connecting rod 44 has an axis in parallel with the axis 13 of the output shaft 17 and is connected with the output shaft 17, the bevel gear 41 and the pendulum arm 43. The connecting rod 44 is connected with the output shaft 17 by screwing an end portion of the connecting rod 44 into a lever 17A fixed to an end portion of the output shaft 17, is connected with the bevel gear 41 by putting the other end portion of the connecting rod 44 through a hole 41a made in the bevel gear 41 (at the distance of r from the axis of the bevel gear 41), and is connected with the pendulum arm 43 by putting the pendulum arm 43 through a hole 50a of a ball joint (ball-and-socket joint) member 50 which is provided rotatably in all directions at the intermediate part of the connecting rod 44. Therefore, the connecting rod 44 is fixed to the output shaft 17 but is slidable in the axis 14 direction in relation to the bevel gear 41 and is also slidable in the axis 12 direction in relation to the pendulum arm 43. The axis 12 of the pendulum arm 43 slants in the direction intersecting rectangularly to the axis 13 by rotation of the rocking axis member 42 and the pendulum arm 43 slides in such slant direction. Even in this case, the change of the included angle between the axis 12 and the axis 14 is absorbed and therefore component in the direction intersecting rectangularly to the axis 13 of the output shaft 17 (out of the force transmitted to the connecting rod 44 from the pendulum arm 43) is absorbed at the connecting point between the pendulum arm 43 and the connecting rod 44 and thus relative movement in the direction intersecting rectangularly to each other is made possible.

Thus, connection of the connecting rod 44 with the pendulum arm 43 in the steering angle ratio varying means 12 is made in such a fashion that both are relatively movable in the direction intersecting rectangularly to the axis 13 and therefore the locus of the connecting point between the pendulum arm 43 and the connecting rod 44 when the pendulum arm 43 rotates, is a circular locus or an ellptical locus on the outer peripheral surface of a cylinder having the radius r with the axis 13 as center.

As stated above, since the connection between the pendulum arm 43 and the connecting rod 44 is made in such a fashion that both are relatively movable in the direction intersecting rectangularly to the axis 13, the angle made by the axis 14 of the connecting rod 44 and the axis 13 of the output shaft 17 can be fixed. Thus, it can be prevented that right and left deviation occurs at the displacement of the output shaft 17.

FIG. 3 shows an output displacement member 51 interposed between the steering angle ratio varying means 12 and the displacement transmitting means 46. The output displacement member 51 is composed of a tubular member 52 and the output shaft 17, one end portion of which being connected with the connecting rod 44 and the other end of which being fitted in the tubular member 52 displaceably in the direction of the axis 13. End portions of the output shaft 17 and the tubular member 52 are supported by supporting members 14a which are integral with the case 45. The tubular member 52 comprises a first tubular part 52b having an engaging part 52a which engages with an engaging end portion A (refer to FIG. 4) of the displacement transmitting means 46, a second tubular part 52c which meshes with the first tubular part 52b and locknut 52d. A hole part of larger diameter 52e is made inside the tubular member 52. At this hole part of larger diameter 52e, spring seats 17a, 17b and a spring 17c which is compressed between both spring seats 17a, 17b are provided, whereby both spring seats 17a, 17b are biassed to the outer side of the axial direction by the spring 17c and contact a retainer 17d and a shoulder part 17e of the output shaft 17 and also contact shoulder parts 52f, 52g at both ends in axial direction of the hole part of larger diameter.

Therefore, in the case where displacement in axis 13 direction is transmitted to the output shaft 17 by the connecting rod 44, such displacement is usually transmitted to the tubular member 52 via the shoulder parts 52f, 52g of the hole part of larger diameter 52e of the tubular member 52 and is further transmitted to the engaging end portion A of the displacement transmitting means 46 from the tubular member 52. However, if movement of the engaging end portion A of the displacement transmitting means 46 controlled and load which is larger than the force of the spring 17c (set at the fixed value) acts on the tubular member 52 at the time of displacement of the output shaft 17, displacement of the output shaft 17 is not transmitted to the tubular member because it is absorbed by contraction of the spring 17c.

The oil pressure change valve 61 comprises a valve housing 62 and a spool 63 which is a valve member provided in the housing 62 in such a fashion that it is displaceable in the direction of axis 15 which is in parallel with the axis 13 of the output shaft 17. The spool 63 is displaced by the output shaft 17 and the rear wheel steering shaft 14 through the medium of the displacement transmitting means 46 (to be described later). By the displacement of the spool 63, supply of oil pressure to the power steering means 13 is controlled. More particularly, if the spool 63 is displaced in the right direction from the neutral position in relation to the valve housing 62, oil pressure is supplied to the right oil room 65 (one side of the cylinder of the power steering means 13) and if the spool 63 is displaced in the left direction, oil pressure is supplied to the left oil room 66 (the other side of the cylinder).

The rear wheel steering shaft 14 extends in vehicle width direction which is in parallel with the axis 13 of the output shaft 17 and steers rear wheels 3R, 3L connected with both ends thereof by its displacement in that direction via the tie rods 21L, 21R and knuckle arms 22L, 22R. Displacement of the rear wheel steering shaft 17 is performed by oil pressure force of the power steering means 13. The rear wheel steering shaft 14 is provided with the centering spring 16. In the case where oil pressure in the oil pressure change valve 61 and the power steering means 13 was extinguished or in the case where damage or trouble occurred at the mechanical system of the rear wheel steering device, for which oil pressure at the cylinder of the power steering means 13 was extinguished by drain-opening the oil pressure system, the rear wheel steering shaft 14 is put in the neutral position (the position at which rear wheels are not steered but are in straight advancing state), namely, the so-called fail-safe is performed.

The cylinder of the power steering means 13 is for displacing the rear wheel steering shaft 14 in vehicle width direction by oil pressure force. A piston 68 is fixed directly to the rear wheel steering shaft 14. Seal members 70, 71 which form the left and right oil rooms 66, 65 are provided on the left and right sides of the piston 68. These seal members 70, 71 are fixed to a housing 72 of the cylinder of the power steering means 13 and are slidable in relation to the rear wheel steering shaft 14.

The displacement transmitting means 46 engages with the output shaft 17, the spool 63, the rear wheel steering shaft 14, as well as the output member 51. This means 46 is operated in such direction that it displaces the spool 63 in the fixed direction by displacement of the output shaft 17 and also in such direction that it displaces the spool 63 in the direction contrary to the above.

Concretely, the displacement transmitting means 46 has a cross lever 46a comprising a vertical lever and a horizontal lever. The vertical lever is engaged at one end portion thereof (the engaging end portion A) with the tubular member 52 of the output displacement member 51 and at the other end portion thereof (the engaging end portion B) with the rear wheel steering shaft 14. The horizontal lever is engaged at one end portion thereof (the engaging end portion C) with the case of the rear wheel steering device 4 fixed to a vehicle body and at the other end portion thereof (the engaging end portion D) with the spool 63. The engaging end portion A, B, D are immovable in axial direction in relation to the tubular member 52 of the output displacement member 51, the rear wheel steering shaft 14 and the spool 63 but are movable and rotatable in other directions. The engaging end portion C is rotatable but is immovable due to a ball point (not shown in the drawing).

An explanation is made below about the principle of operation of this steering device, with reference to FIG. 6 through FIG. 8.

Figure 6:
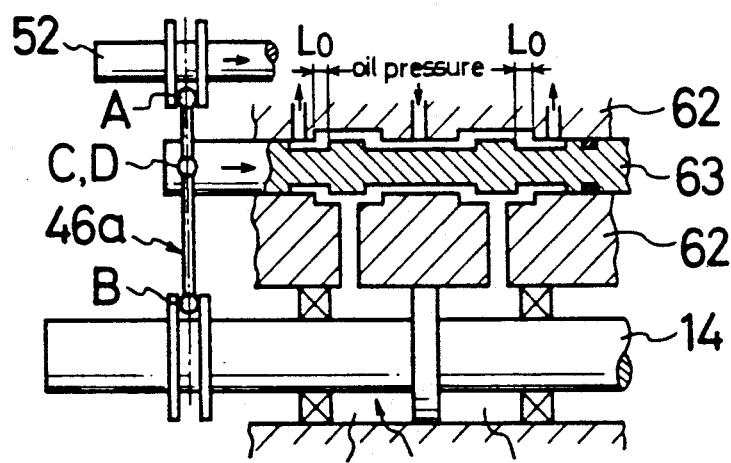
FIG. 6 through FIG. 8 are explanatory drawings, each showing the operation of a displacement transmitting means, an output shaft, an oil pressure change valve and a rear wheel steering shaft.

FIG. 6 is a cross section showing the state in which both the spool 63 and the rear wheel steering shaft 14 are in neutral position, as shown FIG. 4. Suppose the output shaft 17 is displaced in the right direction from this state, the engaging end portion A of the cross lever 46a is displaced in the right direction with the tubular member 52. When the engaging end portion A is displaced, tire reaction and reaction by the centering spring 16 acts on the rear wheel steering shaft 14 and therefore the engaging end portion B is immovable in axial direction. The engaging end portion C is also immovable because it is fitted to the case. Thus, the cross lever 46a slants, with a straight line connecting the engaging end portion C to the engaging end portion B as center as shown in FIG. 7, namely, the cross lever 46a is operated in such direction that it displaces the spool 63 in the fixed direction (the right direction) and displaces the spool 63 in the right direction by the engaging end portion D.

In the neutral state shown in FIG. 6, a tank returning oil passage gap or a gap between the valve housing 62 and the spool 63 is LO at both of the left side oil room 66 and the right side oil room 65. However, when the spool 63 is displaced in the right direction from the neutral position, while the tank returning oil passage gap on the right oil room 65 side narrows, that on the left oil room 66 side widens. Accordingly, while oil pressure of the right oil room 65 increases, that of the left oil room 66 decreases and oil pressure force which pushes the rear wheel steering shaft 14 in the left direction is generated at the power steering means 13. This oil pressure force to push the rear wheel steering shaft 14 in the left direction increases with the increase of displacement in right direction of the spool 63.

Figure 7:
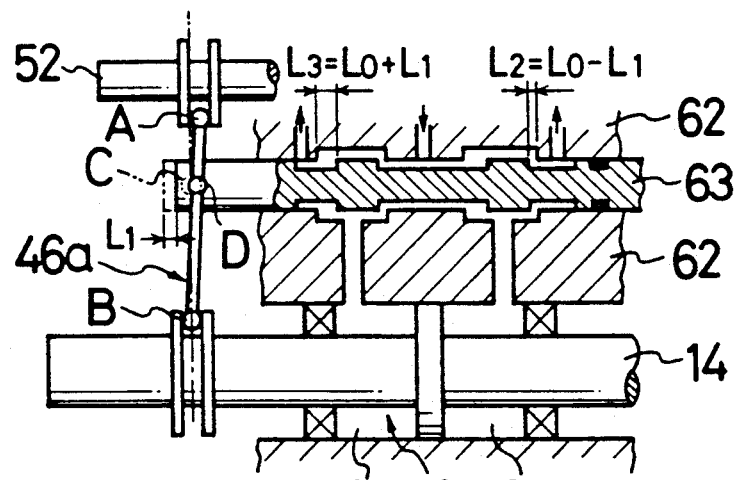
Figure 8:
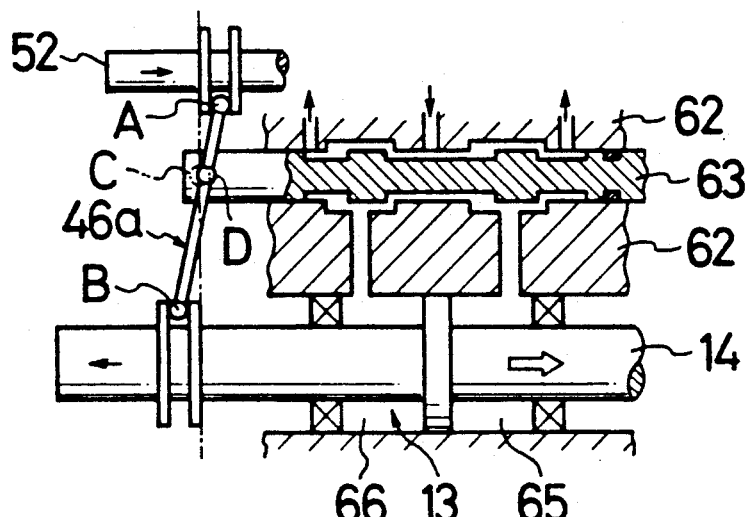

When the spool 63 is displaced from the neutral position shown in FIG. 6 up to the balanced position shown in FIG. 7 (in the right direction by L1), the tank returning oil passage gap on the right oil room 65 side narrows to L2=L0−L1 and the above oil pressure force of the power steering means 13 generated balances with external force (force of the centering spring, tire reaction, etc.).

When the spool 63 is displaced further in the right direction from the state shown in FIG. 7, while the tank returning oil passage gap on the right oil room 65 side becomes narrower than L2, that on the left oil room 66 side becomes wider than L3, whereby oil pressure force to be generated at the power steering means 13 becomes larger than external force which acts on the rear wheel steering shaft 14 and accordingly the rear wheel steering shaft 14 is displaced in the left direction by such oil pressure force.

When the rear wheel steering shaft 14 is displaces in the left direction, the engaging end portion B of the cross lever 46a is displaced, along with the rear wheel steering shaft 14, in the left direction. At this time, the engaging end portion A is immovable because handle steering force, tire reaction of front wheels, etc. are acting on the output displacement member 51 and also the engaging end portion C is immovable. Therefore, when the cross lever 46a returns to the balanced position as shown in FIG. 8 with a straight line connecting the engaging end portion A to the engaging end portion C as center, displacement of the rear wheel steering shaft 14 stops.

When the output shaft 17 is displaced further in the right direction from the above state and the spool 63 is displaced in the right direction, the rear wheel steering shaft 14 is displaced in the left direction but displacement stops when the spool 63 returns to the balanced position. By repeating this operation, the rear wheel steering shaft 14 is displaced by the quantity corresponding to the quantity of displacement of the output shaft 17 and according to that quantity, the rear wheels 3L, 3R are steered. The balanced position varies with the magnitude of external force, for example, when the rear wheel steering shaft 14 is displaced in the left direction as described above, the centering spring 16 bends according to such displacement and the force (external force) by the centering spring 16 becomes larger, whereby the balanced position moves in the right direction from the position shown in FIG. 7. However, movement of the balanced position is very slight (for example, in this embodiment the rear wheel steering shaft 14 is displaced by +10 mm left and right at the maximum from the neutral position) and the balanced position when the rear wheel steering shaft 14 is displaced at the maximum is only about +1 mm away from the neutral position shown in FIG. 6.

In the case where the output shaft is displaced in the left direction, movement of the cross lever 46a, the spool 63 and the rear wheel steering shaft 14 is merely contrary to the above case and the principle of operation is the same as the above case. Therefore, an explanation is omitted.

Control on the change of steering angle ratio by the steering angle ratio varying means 12 can be performed on the basis of various factors and various change control patterns are available. In this embodiment, control is performed by the pattern shown in FIG. 5 so that at a low speed area, improvement of cornering capacity can be planned by steering the rear wheels 3L, 3R in reverse direction to the handle steering and the front wheels 1L, 1R and at a high speed area, improvement of running stability can be planned by steering in the same direction. In this case, handle steering and the front wheel steering are always in the same direction.

In order to perform the above control, the control means 28 stores the steering angle ratio control pattern and a vehicle speed signal is inputted from the vehicle speed sensor 27. In order to realize the steering angle ratio to be obtained by the vehicle speed signal and the steering angle ratio control pattern (FIG. 5), the control means 28 has a rear wheel steering control means 28a. The rear wheel steering control means 28a detects the actual steering angle ratio from the angle of rotation of the central axis of a rocking gear 48 and feedback controls it to the steering angle ratio set by the rotation of the stepping motor 26. The control means 28 receives an output pulse of the vehicle speed sensor 27 and has a vehicle speed calculating means 28g which calculates a vehicle speed on the basis of the cycle between pulses in the state of initial check but in other states, calculates on the basis of the number of pulses outputted within the fixed hours.

The rear wheel steering control means 28a receives outputs of the vehicle speed calculating means 28g and controls the stepping motor 26 so that the two wheel steering position (2WS position) where the steering angle ratio is zero is attained when judgment at initial check is "vehicle speed exists" but the standard position where the steering angle ratio becomes the maximum value in reverse phase (direction) is attained when judgment at initial check is "vehicle speed does not exist".

Figure 10:
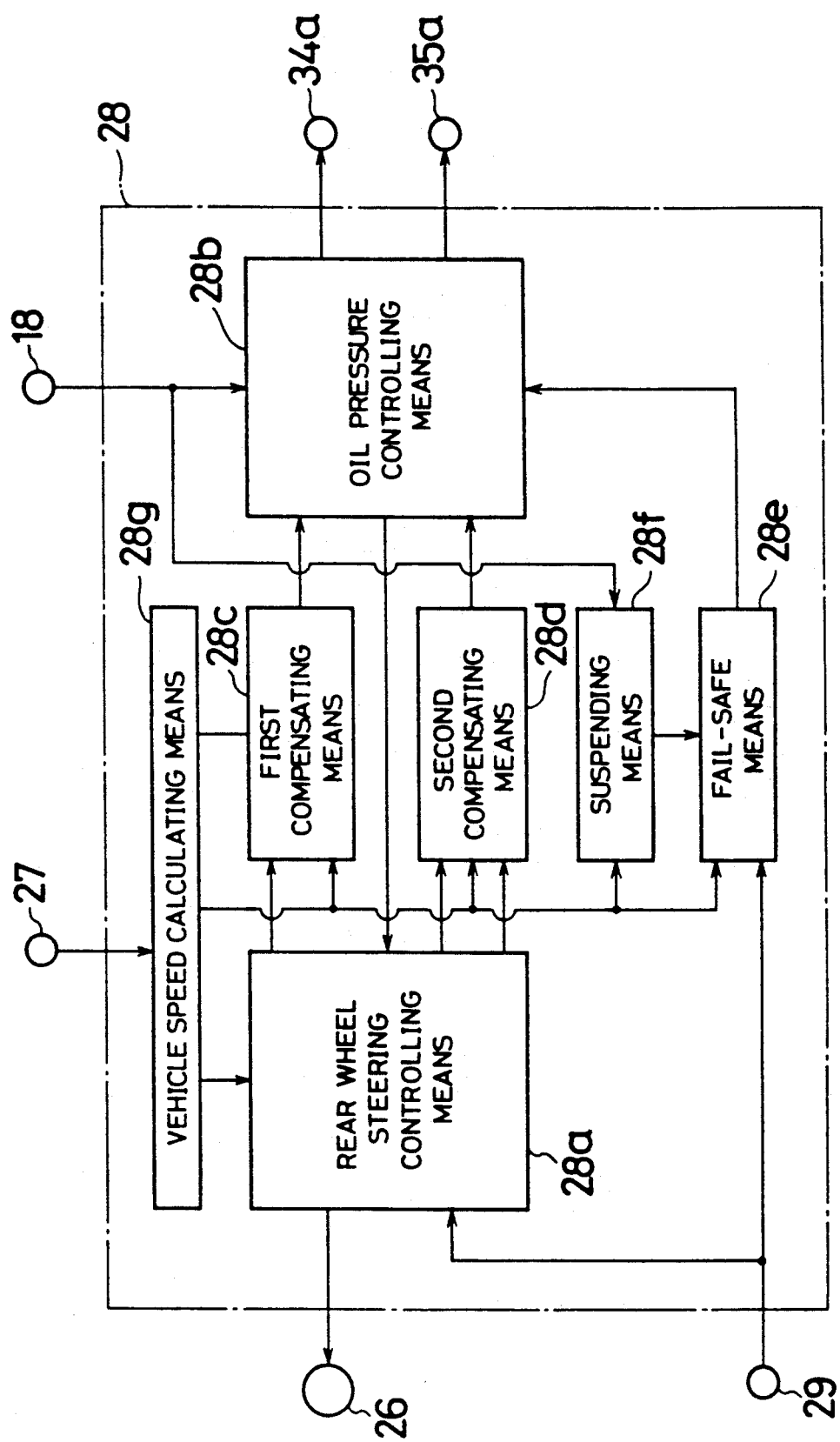
FIG. 10 is a block diagram of a control means.

As shown in FIG. 10, the control means 28 has an oil pressure control means 28b which, when working the stepping motor 26 by initial check, controls the valve means 30 (oil pressure supply means) before the motor is worked to make it supply oil repressure to the oil pressure change valve (as oil pressure assist means), a first corrective means 28c which receives the outputs of the vehicle speed calculating means 28g and the rear wheel steering control means 28a and when controlling the stepping motor 26 to the two-wheel steering position, controls the oil pressure control means 28b after attainment of the two-wheel steering position and makes the valve means 30 supply oil pressure to the oil pressure change valve, and a second correcting means 28d which receives outputs of the vehicle speed calculating means 28g and the rear wheel steering control means 28a and after the start of control to the standard position, makes the rear wheel steering control means 28a start the rear wheel steering control, with the point which is away from the present position by the fixed quantity toward the same phase (direction) as a new present position when judgment is "vehicle speed exists", after the start of control to the standard position. The control means 28 further has a fail-safe means 28e which receives outputs of the vehicle speed calculating means 28g and the steering angle ratio sensor 29 and performs fail-safe when it judges the disagreement between the vehicle speed and the steering angle ratio as "fail" and a prohibiting means 28f which is linked with the fail-safe means 28e and prohibits fail-safe by the fail-safe means 28e on the basis of the disagreement between the vehicle speed and the steering angle ratio when judgment at the initial check is "vehicle speed exists" and control to the two-wheel steering position is performed.

Figure 9:
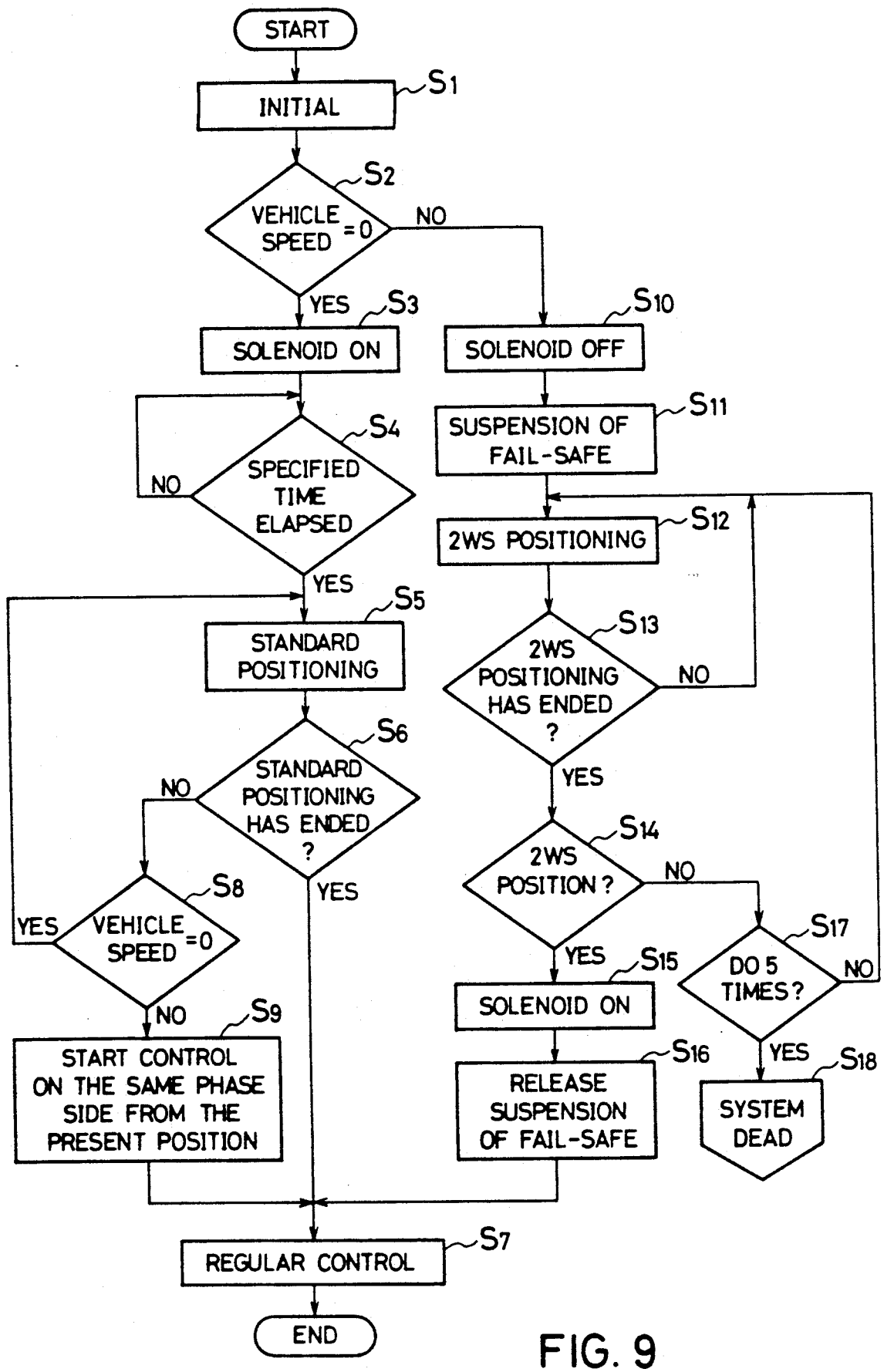
FIG. 9 is a flow chart showing a flow of the control.

The flow of control by the control means 28 is described below, with reference to FIG. 9.

Upon starting with the ignition switch ON, system start, start from the engine stop, etc., at first CPU of the control means 28 is initialized (step $S_1$) and the initial check is started. The reason why the initial check is necessary for the engine stop is that since the electric source of the stepping motor 26 is taken from L-terminal of the alternator, voltage lowers at the engine stop and "system down" occurs.

At first, in order to judge whether or not a vehicle is running, vehicle speed judgment (whether the vehicle speed is 0) is made on the basis of the signal from the vehicle speed sensor (step $S_2$).

Figure 5:
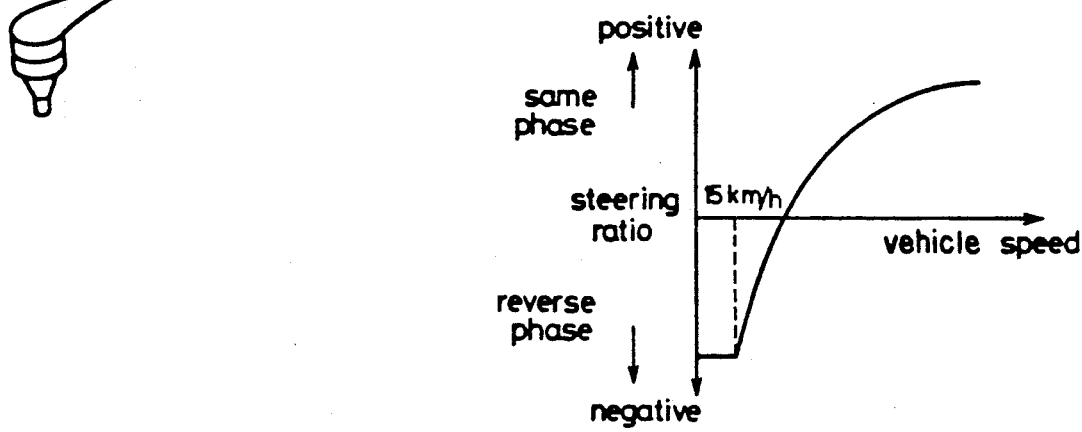
FIG. 5 shows an example of the control pattern of the steering angle ratio.

If the vehicle speed is 0, the vehicle is standing and the steering angle ratio (ratio of the rear wheel steering angle to the front wheel steering angle) should be the maximum value in reverse phase (direction) or the standard position (refer to FIG. 5). Therefore, in order to supply oil pressure solenoids 34a, 35a of the normal open valves 34, 35 are turned ON for excitation (step $S_3$), both valves 34, 35 are closed and it is judged whether or not the fixed hours have elapsed (step $S_4$).

Then, after the lapse of the fixed hours, standard positioning is performed so that the stepping motor 26 (for example, motor speed 380 pps) attains the standard position where the steering angle ratio becomes the maximum valve in reverse phase (direction) (step $S_5$). If the fixed hours have not elapsed, standard positioning is withheld until the fixed hours have elapsed.

Then, it is judged whether or not the standard positioning has ended (step $S_6$). If the standard positioning has ended, the process progresses to the step $S_7$ where usual rear wheel steering control or steering of rear wheels 3L, 3R according to the vehicle speed is performed. On the other hand, if the standard positioning has not ended, it is judged again whether or not the vehicle speed is 0 (step $S_8$). If the vehicle speed is 0, the vehicle is in a standstill state and the process reverts to the step $S_5$ and the standard positioning is resumed. On the other hand, if the vehicle speed is not 0, the vehicle has been changed to the running state from the standstill state and it is undesirable from safety point of view to carry out the standard positioning whereby the maximum value in reverse phase (direction) when the vehicle speed is zero is obtained. Therefore, the present number of steps of the stepping motor is obtained from the steering angle ratio sensor 29 and the steering control on the rear wheels 3L, 3R is started at the position which is by the fixed angle (for example, 1.6°) toward the same direction (more safe side) (step $S_9$) and then the process progresses to step $S_7$.

If the vehicle speed is not zero according to the judgment at step $S_2$, the vehicle is running. In order to eliminate possibility of the rear wheels 3L, 3R being steered to more reverse phase (direction) side than the steering angle ratio to which they should primarily be controlled, solenoids 34a, 35a of the normal open valves 34, 35 are turned OFF for demagnetization (step $S_{10}$) and both valves 34, 35 are opened. Then, at step $S_{11}$ fail-safe which is caused by disagreement between the steering angle ratio and the vehicle speed is prohibited. Importance is attached to driving force, while rotating the stepping motor 26 at a low speed (for example, motor speed 95 pps) and 2WS positioning (steering angle ratio of two-wheel steering) is carried out (step $S_{12}$).

The reason why the fail-safe is prohibited is that rotation of the stepping motor 26 at a low speed gets rid of the corresponding relation between the vehicle speed and the steering angle ratio, which can cause disagreement between them and consequent fail-safe control.

Then, it is judged whether or not 2WS positioning has ended (step $S_{13}$). If 2WS positioning has not ended, the process reverts to step $S_{12}$ where 2WS positioning is resumed. On the other hand, if 2WS positioning has ended, it is judged whether or not 2WS position is really attained (step $S_{14}$). If 2WS position is really attained, the solenoids 34a, 35a of the normal close valves 34, 35 are turned ON because the rear wheels 3L, 3R are not steered even if oil pressure is supplied (step $S_{15}$) and prohibition of fail-safe is released (step $S_{16}$). Then, the process progresses to the usual rear wheel steering control of vehicle speed sensing (step $S_7$). If 2WS position is not attained, it is judged whether or not 2WS positioning is carried out 5 times (step $S_{17}$). If it has not been carried out 5 times, the process reverts to step $S_{11}$ where 2WS positioning is carried out. If it has been carried out 5 times, it is judged that 2WS position is not attained and decision of "fail" is made. Thus, control is regarded as "system dead" (step $S_{18}$). The reason why 2WS positioning is carried out 5 times is that there are cases where it is difficult to attain 2WS position due to shortage of driving force, although the motor 26 is rotating at a low speed with importance attached to driving force and if 2WS position is not attained even by 5 times, positioning, it is almost impossible to attain 2WS position for lack of driving force.

As many apparently widely different embodiments of this invention can be made without departing from the spirit and scope thereof, it is to be understood that the present embodiment is therefore illustrative and not restrictive. The scope of the present invention is defined by the appended claims rather than by the description preceding them, and all changes that fall within meets and bounds of the claims, or equivalence of such meets and bounds, are therefore intended to be embraced by the claims.

What is claimed is:

1. A rear wheel steering device for a vehicle comprising:

a rear wheel steering shaft which steers rear wheels by its displacement;

neutrally holding means which constantly biases said rear wheel steering shaft to a neutral position;

a motor which is linked with said rear wheel steering shaft and changes a steering angle ratio which is the ratio of rear wheel steering angle to front wheel steering angle;

oil pressure assist means which assists displacement of said rear wheel steering shaft by said motor by oil pressure force;

oil pressure supply means which supplies oil pressure to said oil assist means; and oil pressure control means which, when working said motor at an initial check, controls said oil pressure supply means before working of said motor so as to supply oil pressure to said oil pressure assist means.

2. A rear wheel steering device for a vehicle as defined in claim 1, further comprising:

vehicle speed calculating means which calculates a vehicle speed;

a rear wheel steering control means which receives output of said vehicle speed calculating means and controls said motor so that a two-wheel steering position with a two-wheel steering angle ratio is attained according to judgment of "vehicle speed exists" at the initial check and a standard position with a steering angle ratio of the maximum value in reverse phase is attained according to judgment of "vehicle speed does not exist" at the initial check; and first correcting means which receives outputs of said vehicle speed calculating means and said rear wheel control steering means and when controlling said motor to the two-wheel steering control position according to judgment of "vehicle speed exists" at the initial check, controls said oil pressure control means so as to make said oil pressure supply means supply oil pressure to said oil pressure assist means.

3. A rear wheel steering device for a vehicle as defined in claim 2, wherein said oil pressure supply means is a pair of electromagnetic normal open valves which are arranged in parallel at a drain passage through which oil exhausted from an oil pressure pump is returned to a tank and are kept open while not electrified.

4. A rear wheel steering device for a vehicle as defined in claim 3, wherein said rear wheel steering control means receives a signal from said oil pressure control means and control of said motor to a standard position where the steering angle ratio becomes the maximum value in reverse phase according to judgment of "vehicle speed does not exist" is performed after the lapse of a fixed hours following electric supply to said pair of electromagnetic normal open valves.

5. A rear wheel steering device for a vehicle as defined in claim 2, wherein said rear wheel steering control means changes the steering angle ratio according to the vehicle speed in reverse phase at a low speed and in the same phase at a high speed.

6. A rear wheel steering device for a vehicle as defined in claim 4, further comprising second correcting means which receives outputs of said vehicle speed calculating means and said rear wheel steering means and at the initial check makes said rear wheel steering control means start a rear wheel steering control with a new present position which is by a fixed degree toward the same phase side from the present position according to judgment of "vehicle speed exists" after start of movement control to the standard position.

7. A rear wheel steering device for a vehicle as defined in claim 4, further comprising:

steering angle ratio detecting means which detects a steering angle ratio which is a ratio of rear wheel steering angle to front wheel steering angle;

fail-safe means which receives outputs of said steering angle detecting means and said vehicle speed calculating means and performs fail-safe upon judging the disagreement between the vehicle speed and the steering angle ratio as fail; and prohibiting means which is linked with said fail-safe means and prohibits fail-safe by the fail-safe means on the basis of disagreement between the vehicle speed and the steering angle ratio until the two-wheel steering position is attained, when controlling said motor to the two-wheel steering position according to judgment of "vehicle speed exists" at the initial check.

8. A rear wheel steering device for a vehicle as defined in claim 7, further comprising steering angle ratio varying means which is stroke-displaced in vehicle width direction according to the rear wheel steering angle and has an output shaft which displaces said rear wheel steering shaft in vehicle width direction through the medium of displacement transmitting means, wherein the ratio of displacement quantity of said output shaft to the front wheel steering angle varies according to the quantity of rotation of said motor.

9. A rear wheel steering device for a vehicle as defined in claim 8, further comprising power steering means which generates steering force by utilizing oil pressure, wherein said oil pressure assist means is an oil pressure change valve having a valve member displaceable in axial direction in parallel with the axis of said output shaft, said valve member is linked with said output shaft and the rear wheel steering shaft through the medium of the displacement transmitting means and by displacement of the valve member oil pressure supply to the power steering means by displacement of said valve member is controlled.

* * * * *